United States Patent [19]
> Weitzel et al.

[11] 3,776,768

[45] Dec. 4, 1973

[54] STRENGTHENED FIBRE FLEECES

[75] Inventors: Hans Weitzel; Hellmut Striegler, both of Leverkusen, Germany

[73] Assignee: Bayer Aktiengesellschaft, Leverkusen, Germany

[22] Filed: Mar. 8, 1971

[21] Appl. No.: 122,145

[30] Foreign Application Priority Data
Mar. 14, 1970 Germany................... P 20 12 287.6

[52] U.S. Cl. 117/140 A, 117/138.8 F, 117/138.8 N, 117/145, 117/161 UT, 117/161 UN
[51] Int. Cl............................ B32b 27/12, C09d 3/80
[58] Field of Search............... 117/161 UZ, 161 UD, 117/161 UT, 161 UN, 161 UH, 138.8 F, 138.8 N, 145, 161 UC, 140 A; 260/29.7 T, 29.7 H, 80.73

[56] References Cited
UNITED STATES PATENTS

| | | | |
|---|---|---|---|
| 3,352,710 | 11/1967 | Wolf et al............................ | 117/140 |
| 3,288,740 | 11/1966 | Maeder et al................. | 260/80.73 X |
| 3,344,103 | 9/1967 | Eilbeck et al...................... | 260/29.7 |
| 3,138,567 | 6/1964 | Abrams et al. .................... | 260/29.7 |
| 3,095,320 | 6/1963 | Leitner ........................... | 117/161 X |
| 3,440,184 | 4/1969 | Erickson et al.................... | 260/29.7 |
| 3,528,842 | 9/1970 | Skadulis.............................. | 117/100 |
| 3,231,533 | 1/1966 | Garrett et al. | 117/140 |

FOREIGN PATENTS OR APPLICATIONS

| | | | |
|---|---|---|---|
| 747,328 | 11/1966 | Canada............................... | 117/161 |
| 1,193,080 | 5/1970 | Great Britain...................... | 117/161 |
| 1,277,191 | 9/1968 | Germany ........................... | 117/161 |

Primary Examiner—William D. Martin
Assistant Examiner—Harry J. Gwinnel
Attorney—Plumley & Tyner

[57] ABSTRACT

The object of the invention is a strengthened fibre fleece from staple fibres containing as strengthening agent a copolymer based on acrylic and/or methacrylic acid esters and styrene. The copolymer contains additionally in copolymerised form a monomer having nonconjugated carbon double bonds, acrylic acid and methacrylic acid, and methacrylamido-N-methylolmethylether. In a process for producing the strengthened fibre fleece, the fibre fleece is impregnated with an aqueous dispersion of the copolymers and subsequently dried at temperatures between 60° and 130°C.

3 Claims, No Drawings

STRENGTHENED FIBRE FLEECES

The invention relates to strengthened fibre fleeces and a process for their production in which the fibre fleeces are treated with aqueous dispersions.

It is known to use aqueous dispersions of homopolymers and copolymers of monomers having one or more polymerisable double bonds for producing bonded fibre fleeces. It is well known that polymers into which diolefines have been polymerised are not resistant to ageing and must be stabilized. On the other hand, these polymers can be cross-linked by curing at the double bonds which are still free. Another possibility of establishing a transverse connection between the polymer chains by cross-linking consists in incorporating polymerisable compounds which contain reactive groups into the polymer chain and causing them to react by a supply of energy such as heat or radiation.

These reactive groups may be either in their original form or in a masked form and in all cases react in their original form. N-Methylolacrylamide and N-methylolmethyl ether of methacrylic acid amide may be given as examples. The advantage of these polymers which have been cross-linked in this way and which have been prepared without the use of monomers which contain several double bonds is that they give rise to highly cross-linked products which impart to the fibre fleeces a satisfactory resistance to cleaning processes.

This cross-linking must be carried out at relatively high temperatures at which delicate fibres, such as wool fibres, are liable to be damaged. On the other hand, it has often been observed that cross-linking is not completed owing to technical deficiencies in the drying assemblies, and the materials obtained are not resistant, for example, to chemical cleaning processes.

There is a need to overcome these difficulties and to enable the cross-linking process to be completed at lower temperatures. It is known that the degree of cross-linking of the polymer can be increased from the start by incorporating copolymerisable esters of a glycol such as butanediol with (meth)acrylic acid and in addition incorporating N-methylol(meth)acrylamide, fleeces which are very resistant to detergents and solvents being thereby obtained (see DAS No. 1,277,191).

It is an object of the invention to make the conditions required for cross-linking considerably milder without any loss of resistance to detergents and solvents in the fleeces by incorporating a combination of cross-linking monomers which have two polymerisable double bonds and methacrylamido-N-methylolmethylether and acrylic acid/methacrylic acid.

This invention therefore relates to strengthened fibre fleeces obtained from natural, synthetic or mineral staple fibres or from mixtures of these staple fibres containing as strengthening agent a copolymer based on acrylic and/or methacrylic acid esters and styrene, which copolymer contains 0.2 to 2 per cent by weight of a monomer having two isolated polymerisable carbon double bonds and 0.1 to 5 percent by weight of methacrylamide-N-methylolmethylether and 1 to 10 percent by weight of acrylic acid and methacrylic acid in a polymerised form, the proportion of acrylic acid to methacrylic acid being between 1:10 and 10:1 and the proportion of monomer which has two carbon double bonds to acrylic acid and methacrylic acid being between 1:20 and 4:1.

Another object of the invention is a process for strengthening fibre fleeces in which aqueous dispersions of acrylic and/or methacrylic acid esters and styrene are used as binders, these dispersions containing 0.2 to 2 percent by weight of compounds which have two polymerisable double bonds, 0.1 to 5 percent by weight of methacrylamido-N-methylolmethylether and 1 to 10 percent by weight of acrylic acid and methacrylic acid, the percentages by weight being based on the total amount of polymer.

The copolymers mentioned above are copolymers which contain a major amount of acrylic and/or methacrylic acid esters incorporated by polymerisation. Acrylic and methacrylic acid esters of alcohols which contain 1 to 8 carbon atoms are especially suitable, for example the butyl esters, isobutyl esters, methyl esters, ethyl esters, propyl esters, hexyl esters and ethyl hexyl esters. The copolymers for use according to the invention preferably also contain 1 to 60 percent by weight of styrene, based on the total weight of polymer. The copolymers may also contain up to 15 percent by weight, based on the total polymer, of compounds into which a copolymerisable double bond has been polymerised but which are not identical with the compounds mentioned above. Examples of these are the nitriles and amides of acrylic and methacrylic acid, vinyl ether, vinyl chloride and vinylidene chloride.

0.2 to 2 percent by weight, based on the total polymer, of a compound which has two nonconjugated polymerisable carbon double bonds are also incorporated by polymerisation. Especially suitable compounds of this type are the esters of acrylic and/or methacrylic acid with bifunctional alcohols such as ethylene glycol and butane-1,4-diol. Vinyl esters of acrylic and methacrylic acid are also suitable. Other esters which contain two polymerisable double bonds, such as divinyl or diallyl esters of dicarboxylic acids and allyl or methallyl esters of acrylic and methacrylic acid and, for example, divinylbenzene, its derivatives and substitution products and amide derivatives of ethylenically unsaturated carboxylic acids, such as methylene bisacrylamide, are also suitable.

The dispersions are prepared in the usual manner but preferably with a maximum of 1 percent by weight of emulsifier, based on the total weight of the copolymer. The following are examples of suitable emulsifiers: Higher alkylsulphonates, acidic sulphuric acid esters of fatty alcohols, alkylarylsulphonates, sulphonated castor oil, sulphosuccinic acid esters, watersoluble reaction products of ethylene oxide and long chained fatty alcohols or phenols, water-soluble salts of sulphonated ethylene oxide adducts and water-soluble salts of optionally alkylated naphthalenesulphonic acids and their condensation products with formaldehyde.

The concentration of the dispersions may vary within wide limits according to the purpose for which they are to be used and the method by which they are to be worked up. The dispersions preferably have a solids content of about 40 to 50 percent by weight.

Fibre fleeces which are strengthened in accordance with the invention may be produced from synthetic or natural fibres, for example cotton fibres, wool fibres, silk fibres or rayon staple fibres or synthetic fibres of polyacrylonitrile, polyesters, polycarbonates, polyamides (Nylon 6, Nylon 66), elastomer fibres or glass fibres or other mineral fibres. The fibre fleeces may also be produced from mixtures of the fibres mentioned above.

Before or at the time of applying the dispersions to the fibre fleeces it may frequently be advantageous to add additives to the dispersions, e.g., protective colloids, emulsifiers, wetting agents, substances which promote or prevent foaming, substances which render the materials hydrophobic, dyes or fillers. In many cases, it may also be advantageous to add polycondensation products, for example of formaldehyde and urea or melamine, or etherification products of these condensates.

The aqueous dispersions of binder are advantageously applied to these fleeces by spraying, full bath impregnation or nip padding.

The fibre masses containing the binder are then dried for some time, 3 to 10 minutes being generally sufficient, a moderate temperature being advantageously employed at first, generally a temperature of between 60° and 100° C. The binder clearly starts to undergo cross-linking at this stage. The binder is then converted into the insoluble state by further heat treatment, preferably at 80° to 130° C. In principle, heat treatment alone is sufficient to convert the binder into the insoluble state but the heating time can be reduced by the addition of reaction accelerating compounds to the binder, e.g., acids or compounds which give off acids, such as phosphoric acid, p-toluene-sulphonic acid, acetic acid, aluminium chloride, zinc chloride, magnesium chloride, ammonium nitrate or ammonium oxalate.

The strengthened fibre fleeces produced according to the invention have excellent resistance to ageing and do not undergo yellowing. They are very resistant to detergents and solvents.

In practice, it is frequently desirable to produce fleeces which are soft and have a springy elasticity, e.g., for use as interlining for garments. Fleeces which have been produced with the dispersions described here can be worked up especially conveniently because they have the advantage of not producing any difficulties in the making up of the material as has hitherto been the case and moreover the unpleasant sticky handle at the surface of the fleece material no longer occurs. Although this last mentioned disadvantage could be obviated in the known processes by using harder copolymers, fibre fleeces strengthened in this way then no longer have sufficient springy elasticity.

The examples given below serve to explain the process of the invention. The parts indicated are in all cases parts by weight.

Example 1 and Comparison examples A, B and C

A staple fibre fleece having a weight of about 30 g/m² and produced from regenerated cellulose fibres is impregnated with the 24 percent aqueous dispersion of a copolymer, squeezed off to reduce the water uptake to 100 percent (based on the weight of fibres), dried and condensed. The resulting fleece has a very pleasant, dry handle and good resistance to dry cleaning and washing. The series of dispersions and binders used showed the variations indicated in column I at a constant monomer ratio of butyl acrylate (58 parts) to styrene (34 parts) to methacrylamido-N-methylolmethylether (5 parts). Column II shows the tear resistances of the fleece and column III the conditions of condensation.

TABLE 1

| | I | | | II | | | III |
|---|---|---|---|---|---|---|---|
| | | | | Tear resistance (kg. wt./cm.²) | | | Condensation 5 min. at 0° C. |
| No. | Acrylic acid | Methacrylic acid | Ethylene glycol-bis-methacrylate | Dry | Wet (CH₂O) | Wet (trichloroethylene) | |
| 1 | 1.95 | 1.05 | 0.4 | 71 | 32 | 34 | 110 |
| | | | | 74 | 36 | 47 | 130 |
| | | | | 77 | 34 | 52 | 150 |
| A | 1.95 | 1.05 | | 79 | 38 | 31 | 110 |
| | | | | 76 | 39 | 39 | 130 |
| | | | | 76 | 37 | 46 | 150 |
| B | 3.0 | | 0.4 | 76 | 39 | 42 | 110 |
| | | | | 71 | 37 | 49 | 130 |
| | | | | 66 | 35 | 52 | 150 |
| C | | 3.0 | 0.4 | 68 | 30 | 0 | 110 |
| | | | | 72 | 36 | 40 | 130 |
| | | | | 74 | 35 | 48 | 150 |

It will be seen from Example 1 and comparison examples A – C that the combination of acrylic acid, methacrylic acid and bifunctional compound imparts optimum properties to the copolymers.

Example 2

A predyed fleece obtained from polyamide-6 staple fibres stitched to a jute fabric and having a weight of 500 g/m² and a thickness of 5 mm is impregnated by padding with a 20 percent dispersion of a copolymer as described in Example 1 with the addition of 1.5 percent of a cationic antimicrobial organic compound (e.g., Eulan-Asept) to the bath. The fleece is dried and condensed as described in Example 1. A floor covering which has excellent resistance to abrasion and dimensional stability and in addition inhibits the growth of bacterial cultures is obtained.

Example 3

A fleece of polyester staple fibres (polyethylene glycol terephthalate, staple length 60 mm, 3.3 dtex) which has been produced by crimping and which has a weight of about 200 g/m² and a thickness of 5 cm is sprayed on both sides with the mixture described in Example 2 of a dispersion of binder and cationic organic solvents in the proportions indicated (application 20 g of solids on each side, based on the weight of fibres), dried and condensed for one minute at 130° C. This high bulk fleece treated with an antimicrobial finish as in Example 2 can be incorporated in eiderdowns. Such eiderdowns have excellent heat retention and a pleasant handle, can be chemically cleaned without any adverse effect and do not constitute a nutrient medium for bacteria.

We claim:

1. Strengthened fibre fleeces of natural, synthetic or mineral staple fibers or mixtures of such staple fibers containing as a strengthening agent a copolymer comprising:

a. A major amount of acrylic or methacrylic acid ester;

b. at least 1 percent by weight of styrene;

c. 0.2 to 2 percent by weight of monomer having two non-conjugated polymerizable carbon double bonds;

d. 0.1 to 5 percent by weight of methacrylamido-N-methylolmethylether; and e. 1 to 10 percent by weight of acrylic acid and methacrylic acid, the proportions of acrylic acid and methacrylic acid being between 1:10 and 10:1 and the proportions of monomer having two non-conjugated polymerizable carbon double bonds to acrylic acid and methacrylic acid being between 1:20 and 4:1.

2. The product of claim 1 in which the acrylic acid esters and methacrylic acid esters are esters of acrylic and methacrylic acid with aliphatic alcohols which have 1 to 8 carbon atoms.

3. The product of claim 1 which contains a cationic anti-microbial organic substance.

* * * * *